(12) United States Patent
Huang et al.

(10) Patent No.: US 10,445,173 B2
(45) Date of Patent: Oct. 15, 2019

(54) METHOD AND DEVICE FOR PROGRAMMING NON-VOLATILE MEMORY

(71) Applicant: MACRONIX INTERNATIONAL CO., LTD., Hsinchu (TW)

(72) Inventors: Shih-Chang Huang, Magong (TW); Kun-Tse Lee, Zhubei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 284 days.

(21) Appl. No.: 15/632,460

(22) Filed: Jun. 26, 2017

(65) Prior Publication Data

US 2018/0373584 A1 Dec. 27, 2018

(51) Int. Cl.
G06F 11/10 (2006.01)

(52) U.S. Cl.
CPC ........ G06F 11/102 (2013.01); G06F 11/1072 (2013.01)

(58) Field of Classification Search
CPC . G11C 11/5628; G11C 16/34; G11C 16/3454; G11C 16/3459; G06F 11/102; G06F 11/1072
See application file for complete search history.

(56) References Cited

U.S. PATENT DOCUMENTS

| | | | |
|---|---|---|---|
| 5,671,178 A * | 9/1997 | Park | G11C 29/82 365/185.09 |
| 5,787,039 A * | 7/1998 | Chen | G11C 16/10 365/185.11 |
| 7,352,630 B2 * | 4/2008 | Lee | G11C 16/3454 365/185.22 |
| 7,355,892 B2 | 4/2008 | Hemink | |
| 7,917,685 B2 | 3/2011 | Ha | |
| 8,270,215 B2 | 9/2012 | You et al. | |
| 8,331,145 B2 | 12/2012 | Kang | |
| 8,988,947 B2 | 3/2015 | Ito | |
| 9,183,924 B2 * | 11/2015 | Lee | G11C 29/04 |
| 2010/0315880 A1 * | 12/2010 | Joo | G06F 11/1048 365/185.22 |
| 2011/0179322 A1 * | 7/2011 | Lee | G06F 11/1048 714/719 |

* cited by examiner

Primary Examiner — Phung M Chung
(74) Attorney, Agent, or Firm — McClure, Qualey & Rodack, LLP

(57) ABSTRACT

A method for programming a non-volatile memory in a programming operation is provided. The non-volatile memory has a number of cells and each of part of the cells stores data having at least 2 bits at least corresponding to a first page and a second page. The first programming-verifying operation including programming the first page and verifying whether the first page is successfully programmed is performed. When a first original fail-bit number for the first page is more than a predetermined fail-bit value, a second programming-verifying operation to the first page is performed to obtain a first over-counting fail-bit number for the first page and reduce the first original fail-bit number by the first over-counting fail-bit number. When the reduced first original fail-bit number is not more than the predetermined fail-bit value, the first page is set as successfully programmed.

14 Claims, 5 Drawing Sheets

METHOD AND DEVICE FOR PROGRAMMING NON-VOLATILE MEMORY

TECHNICAL FIELD

The disclosure relates to a non-volatile memory, especially a method and a device for programming a non-volatile memory.

BACKGROUND

In the recent years, non-volatile memories are commonly used in various electronic devices, such as personal computers, laptop computers, smart phones, tablets, and etc. A non-volatile memory includes an array of memory cells. For the purpose of driving down costs, more bits are stored in one memory cell to increase its density. Multi-Level-Cell (MLC) technology is adopted to increase the memory capacity at low fabrication cost.

During a lifetime of a non-volatile memory, repeated programming and erasing operations lead its malfunction and cause bit errors in the memory cells. Error Correction Codes (ECC) operation is used to improve the reliability of the non-volatile memory. However, the operation time of ECC operation and the data accuracy are big issues in memory design.

Therefore, there is a need to provide a method and a device for programming a non-volatile memory to improve programming performance and ECC operation efficiency.

SUMMARY

The disclosure relates to a method and a device for programming a non-volatile memory. By means of the present disclosure, some pages of the non-volatile memory, which were set as failed after programming, could be reset as successfully programmed, and the memory block corresponding to the successfully programmed pages would not be set as a bad block. The ECC operation efficiency could be improved and the time for programming verify could be reduced.

According to the first aspect of the present disclosure, a method for programming a non-volatile memory in a programming operation is provided. The method comprises the following steps. The non-volatile memory is provided. The non-volatile memory has a plurality of multi-level cells and each of part of the multi-level cells stores data having at least 2 bits at least corresponding to a first page and a second page. A first programming-verifying operation to the multi-level cells of the first page is performed. The first programming-verifying operation comprises programming the multi-level cells of the first page and verifying whether the multi-level cells of the first page is successfully programmed. It is determined that whether a first original fail-bit number for the multi-level cells of the first page is more than a predetermined fail-bit value. When the first original fail-bit number for the multi-level cells of the first page is more than a predetermined fail-bit value, the first page is set as failed. A second programming-verifying operation to the multi-level cells of the first page is performed when the first page is set as failed. The second programming-verifying operation comprises obtaining a first over-counting fail-bit number for the first page and reducing the first original fail-bit number by the first over-counting fail-bit number. It is determined whether the reduced first original fail-bit number is more than the predetermined fail-bit value. When the reduced first original fail-bit number is not more than the predetermined fail-bit value, the first page is set as successfully programmed.

According to the second aspect of the present invention, a method for programming a non-volatile memory in a programming operation is provided. The non-volatile memory has a plurality of multi-level cells and each of part of the multi-level cells stores data having at least 2 bits at least corresponding to a first page and a second page. The method comprises the following steps. At least one programming pulse to program the multi-level cells of the first page is provided. At least one first program-verify pulse is provided to verify whether the multi-level cells of the first page is successfully programmed. It is determined whether a first original fail-bit number for the multi-level cells of the first page is more than a predetermined fail-bit value. When the first original fail-bit number for the multi-level cells of the first page is more than the predetermined fail-bit value, a program-fail-reference signal is enabled. At least one second program-verify pulse is provided to obtain a first over-counting fail-bit number for the first page, to reduce the first original fail-bit number by the first over-counting fail-bit number, and to verify whether the reduced first original fail-bit number is more than the predetermined fail-bit value when the first page is set as failed. When the reduced first original fail-bit number is not more than the predetermined fail-bit value, the program-fail-reference signal is disabled.

According to the third aspect of the present invention, a device for programming a non-volatile memory in a programming operation is provided. The non-volatile memory has a plurality of multi-level cells and each of part of the multi-level cells stores data having at least 2 bits at least corresponding to a first page and a second page. The device includes a state machine and a fail-bit-detect controller. The state machine provides at least one programming pulse to program the multi-level cells of the first page and provides at least one first program-verify pulse to verify whether the multi-level cells of the first page is successfully programmed. The fail-bit-detect controller determines whether a first original fail-bit number for the multi-level cells of the first page is more than a predetermined fail-bit value. when the first original fail-bit number for the multi-level cells of the first page is more than a predetermined fail-bit value, the state machine enables a program-fail-reference signal and provides at least one second program-verify pulse to obtain a first over-counting fail-bit number for the first page, to reduce the first original fail-bit number by the first over-counting fail-bit number, and to verify whether the reduced first original fail-bit number is more than the predetermined fail-bit value when the first page is set as failed. When the reduced first original fail-bit number is not more than the predetermined fail-bit value, the state machine disables the program-fail-reference signal.

The above and other aspects of the invention will become better understood with regard to the following detailed description of the preferred but non-limiting embodiment(s). The following description is made with reference to the accompanying drawings.

DETAILED DESCRIPTION

Figure 1A:
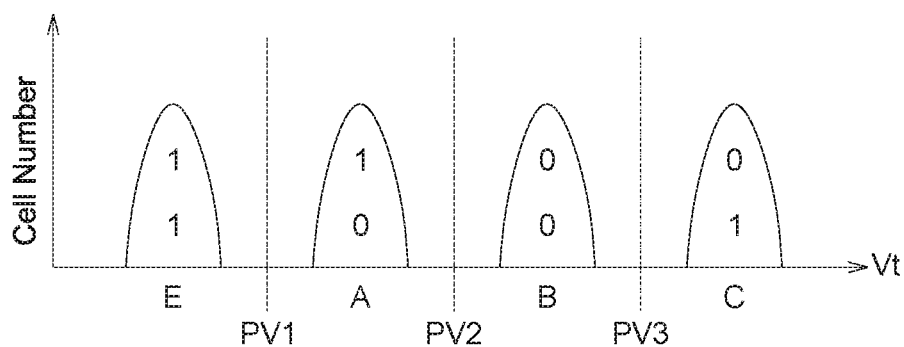
FIG. 1A shows a diagram illustrating a distribution of threshold voltages (Vt) for multi-level cells (MLC) according to one embodiment of the present disclosure.
Figure 1B:
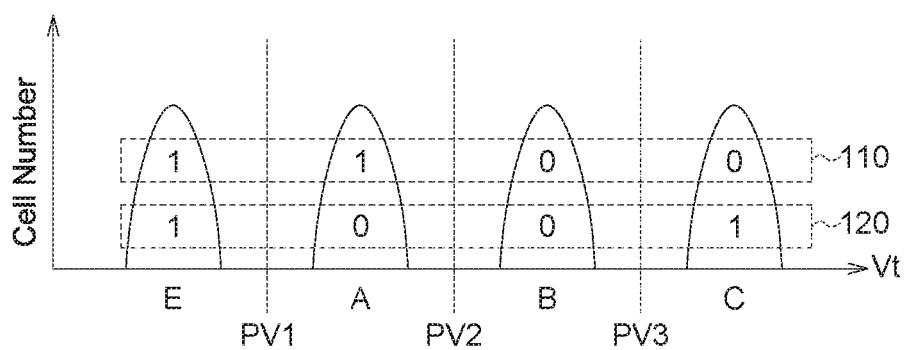
FIG. 1B shows a diagram illustrating a high page and a low page in a distribution of threshold voltages (Vt) for multi-level cells (MLC) according to one embodiment of the present disclosure.

Please referring to FIGS. 1A and 1B, FIG. 1A shows a diagram illustrating a distribution of threshold voltages (Vt) for multi-level cells (MLC) according to one embodiment of the present disclosure, and FIG. 1B shows a diagram illustrating a high page and a low page in a distribution of threshold voltages (Vt) for multi-level cells (MLC) according to one embodiment of the present disclosure. In this example, each memory cell of a memory cell array of a non-volatile memory stores 2-bit data, and each of MLC has four logical states, namely "11", "10", "00", and "01", to represent 2-bit data per cell, as shown in FIG. 1A. The 2 bits of each MLC are mapped to two independently accessible logical pages, i.e. high page 110 and low page 120, as illustrated in FIG. 1B. In this example, the program-verify voltage PV1 is used to determine the low boundary of cell Vt distribution of logical state "10". Similarly, the program-verify voltages PV2 and PV3 respectively are used to determine the low boundary of cell Vt distributions of logical states "00" and "01". The region of cell Vt distributions of logical states "11", "10", "00" and "01" are marked with E, A, B, and C, respectively.

Figure 2:
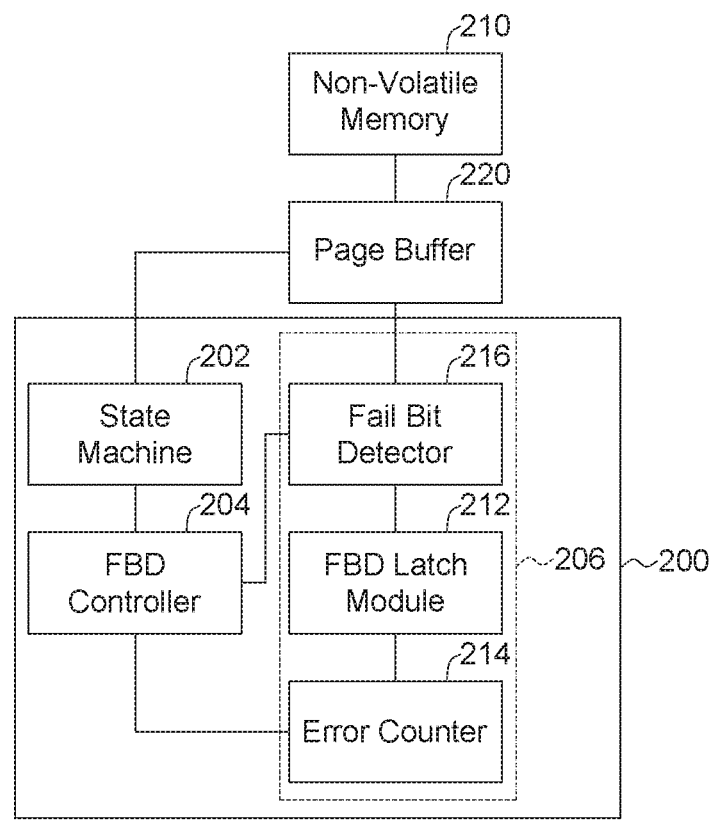
FIG. 2 is a block diagram illustrating a device for programming a non-volatile memory according to one embodiment of the present disclosure.

FIG. 2 is a block diagram illustrating a device 200 for programming a non-volatile memory 210 according to one embodiment of the present disclosure. The non-volatile memory 210 can retain its information when the power is turned off. For example, the non-volatile memory 210 is read-only memory (ROM), programmable read-only memory (PROM), electrically alterable read only memory (EAROM), erasable programmable read only memory (EPROM), electrically erasable programmable read only memory (EEPROM), or flash memory. The page buffer 220 is used to store the data of a page (high page or low page) of the non-volatile memory 210 during an operation of the non-volatile memory 210. The device 200 includes a state machine 202, a fail-bit-detect (FBD) controller 204 and an FBD circuit 206.

The state machine 202 is coupled to the page buffer 220 and the FBD controller 204. The state machine 202 is used to control the operation mode of the non-volatile memory 210 in response to some external instructions from an interface (not shown in FIG. 2) via a bus. For example, the interface is an input/out interface. The operation mode is one of programming (writing) operation, reading operation, and erasing operation. The state machine 202 provides at least one programming pulse to program multi-level cells of a high or low page of the non-volatile memory 210 and provides at least one first program-verify pulse to verify whether the programmed multi-level cells are successfully programmed. For example, the voltage PV3 is used to verify whether the memory cell which is expected to be programmed to state "01" (region C) is programmed successfully. The voltage PV2 is used to verify whether the memory cell which is expected to be programmed to state "00" (region B) is programmed successfully. The voltage PV1 is used to verify whether the memory cell which is expected to be programmed to state "10" (region A) is programmed successfully.

Take each memory cell of a non-volatile memory storing 2-bit data with four states, as shown in FIGS. 1A and 1B, as an example. In a programming operation, when the multi-level cell which should be programmed to state "10" (region A) is programmed to state "11" (region E), the multi-level cell is set as programmed unsuccessfully or programmed failed. Similarly, the multi-level cell which should be programmed to state "00" (region B) but is programmed to state "11" (region E) or state "10" (region A), and the multi-level cell which should be programmed to state "01" (region C) but is programmed to state "11" (region E), state "10" (region A) or state "00" (region B) would be set as programmed unsuccessfully as well. The multi-level cell set as programmed unsuccessfully is called fail bit in this disclosure.

The FBD controller 204 is coupled to the state machine 202 and the FBD circuit 206. The FBD controller 204 is used to control the FBD circuit 206 to perform a fail-bit-detect procedure for detecting fail bits during a programming operation.

The FBD circuit 206 includes a fail bit detector 216, an FBD latch module 212 and an error counter 214. The fail bit detector 216 is used to detect fail bits which should be programmed to state "10" but are programmed to state "11", or should be programmed to state "00" but are programmed to state "11" or state "10", or should be programmed to state "01" but are programmed to state "11", state "10" or state "00", and count a number of the fail bits.

The FBD latch module 212 is used as a data storage for storing the number of the fail bits counted by the fail bit detector 216. The error counter 214 is used to accumulate the numbers of the fail bits counted by the fail bit detector 216 and transmit the accumulated numbers of the fail bits to the FBD controller 204. Thus, FBD controller 204 determines whether the accumulated numbers for the multi-level cells of the high or low page is more than a predetermined fail-bit value N. For example, the predetermined fail-bit value N is the maximum number of fail bits which an Error Correction Codes (ECC) operation could correct. For example, the FBD controller 204, the FBD circuit 206, the fail bit detector 216, and error counter 214 can be implemented by a chip, a circuit block in a chip, a circuit board including a number of electric elements and a number of conductive wires, or a computer readable medium storing a number of program codes.

Figure 3:
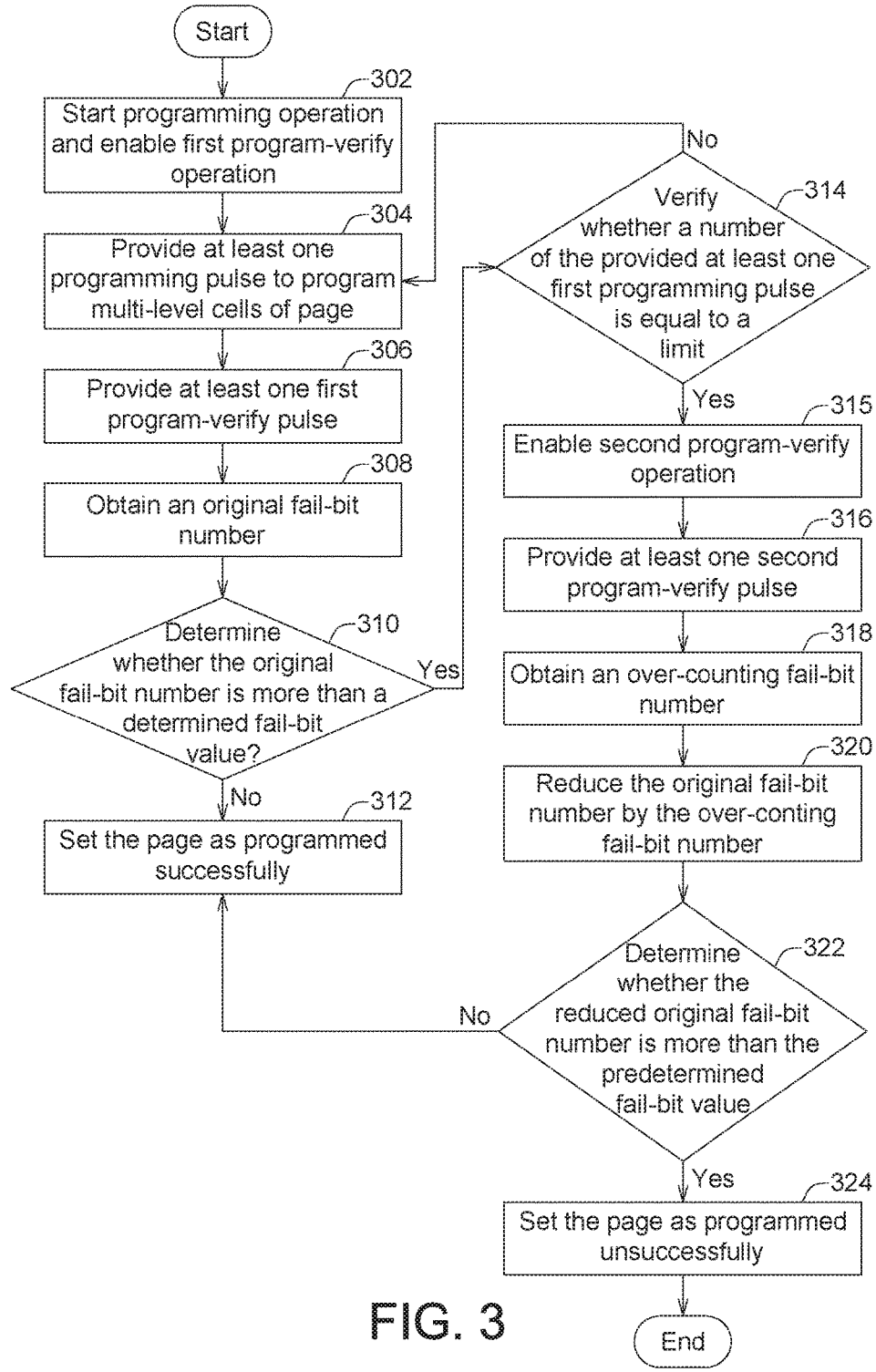
FIG. 3 illustrates a flow diagram for a method for programming a non-volatile memory according to an embodiment of this disclosure.

Please refer to FIG. 3. FIG. 3 illustrates a flow diagram for a method for programming a non-volatile memory according to an embodiment of this disclosure. To clearly illustrate the operation of the various elements of the above-described embodiments and the present embodiment, the method for programming the non-volatile memory is described with the following detailed description of a flowchart below. However, those skilled in the art can understand, the method of the present embodiment is applied but not limited to the device 200 in FIG. 2, and it is not limited to the order of the steps of the flowchart. Although the example technique involves operations being performed in a specific order, variants of the technique according to some embodiments can involve these or different operations being performed in different orders.

Figure 4:
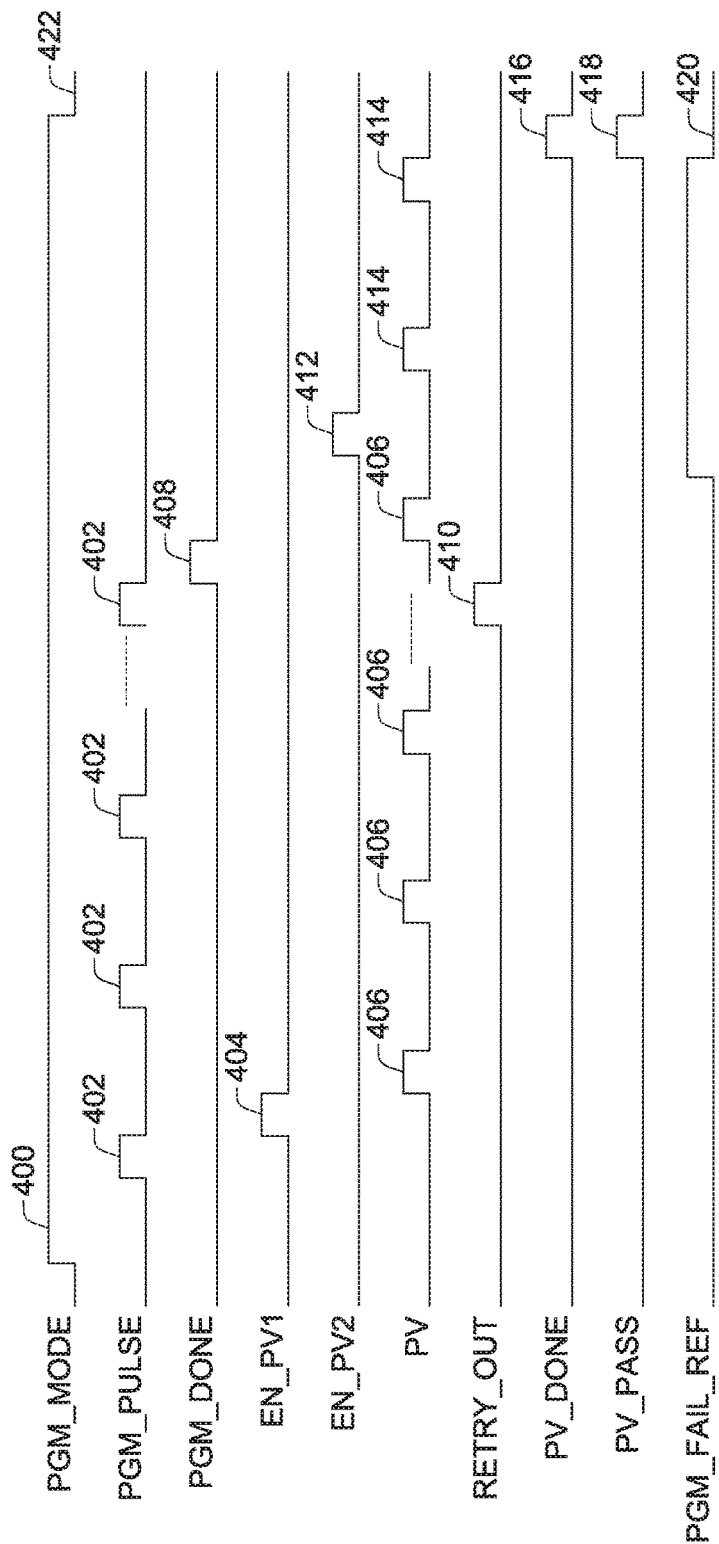
FIG. 4 illustrates a waveform of signals according an embodiment of this disclosure.

Please refer to FIGS. 1B, 2, 3, and 4. FIG. 4 illustrates a waveform of signals according an embodiment of this disclosure. According to an embodiment of the present invention, in block 302, the state machine 202 receives an instruction of programming mode from an interface to change the operation mode of the non-volatile memory 210 to a programming operation, and a first program-verify operation is enabled. During the programming operation, the following operations, blocks 304 to 324, are performed.

In block 304, the state machine 202 provides at least one programming pulse (for example, the pulse 402 in FIG. 4) to the page buffer 220 to program multi-level cells of a page (low page or high page, although multi-level cells of low page and high page are programmed at the same time) of the non-volatile memory 210 and then the state machine 202 provides at least one first program-verify pulse (for example, the pulse 406 in FIG. 4) to the page buffer 220 to verify whether the programmed multi-level cells are successfully programmed in block 306.

In the programming operation, when the multi-level cell storing 2-bit data with four logical states which is expected to be programmed to state "10" is programmed in state "11", the multi-level cell is set as programmed unsuccessfully and is set as a fail bit. Similarly, when the multi-level cell which is expected to be programmed to state "00" is programmed in state "11" or state "10", the multi-level cell is set as programmed unsuccessfully and is set as a fail bit. When the multi-level cell which is expected to be programmed to state "01" is programmed in state "11", state "10" or state "00", the multi-level cell is set as programmed unsuccessfully and is set as a fail bit as well.

In block 308, the state machine 202 sends a fail-bit-detect instruction to the fail-bit-detect (FBD) controller 204 to obtain an original fail-bit number of fail bits of a page (low page or high page).

For example, in the program-verify operation of the high page 110, the multi-level cells in state "00" are sensed by using voltage PV2, and then data of state "00" is output to the FBD circuit 206 to accumulate the number of the multi-level cells which are expected to be programmed to state "00" but are programmed in state "11" or state "10". The accumulated number of the fail bits for state "00" is defined as "FBD@B1", and FBD@B1 is latched in the FBD latch module 212. In addition, the multi-level cells in state "01" are sensed by using voltage PV3, and then data of state "01" is output to the FBD circuit 206 to accumulate the number of the multi-level cells which are expected to be programmed to state "01" but are programmed in state "11", state "10" or state "00". The accumulated number of the fail bits for state "01" is defined as "FBD@C1", and FBD@C1 is latched in the FBD latch module 212. The original fail-bit number for high page is sum of FBD@B1 and FBD@C1 (FBD@B1+FBD@C1).

In the program-verify operation of the low page 120, the multi-level cells in state "10" are sensed by using voltage PV1, and then data of state "10" is output to the FBD circuit 206 to accumulate the number of the multi-level cells which are expected to be programmed to state "10" but are programmed in state "11". The accumulated number of the fail bits for state "10" is defined as "FBD@A2", and FBD@A2 is latched in the FBD latch module 212. The multi-level cells in state "00" are sensed by using voltage PV2, and then data of state "00" is output to the FBD circuit 206 to accumulate the number of the multi-level cells which are expected to be programmed to state "00" but are programmed in state "11" or state "10". The accumulated number of the fail bits for state "00" is defined as "FBD@B2", and FBD@B2 is latched in the FBD latch module 212. In addition, the multi-level cells in state "01" are sensed by using voltage PV3, and then data of state "01" is output to the FBD circuit 206 to accumulate the number of the multi-level cells which are expected to be programmed to state "01" but are programmed in state "11", state "10" or state "00". The accumulated number of the fail bits for state "01" is defined as "FBD@C2", and FBD@C2 is latched in the FBD latch module 212. The original fail-bit number for low page is sum of FBD@A2, FBD@B2 and FBD@C2 (FBD@A2+FBD@B2+FBD@C2).

In block 310, FBD controller 204 determines whether the original fail-bit number for the multi-level cells of the high or low page is more than a predetermined fail-bit value N. For example, the predetermined fail-bit value N is the maximum number of fail bits which an Error Correction Codes (ECC) operation could correct. If the original fail-bit number for the multi-level cells of the high or low page is equal to or less than the predetermined fail-bit value N, the process proceeds to block 312. In block 312, the state machine 202 enables a program-pass signal (for example, PV_PASS signal 418 in FIG. 4) to set the cells of the high or low page of the non-volatile memory 210 as programmed successfully.

If the original fail-bit number for the multi-level cells of the high or low page is more than the predetermined fail-bit value N, the process proceeds to block 314. In block 314, the state machine 202 verifies whether a number of the provided at least one programming pulse (for example, the pulse 402 in FIG. 4) is equal to a limit. When the number of the provided at least one programming pulse is less than the limit, the process proceeds to block 304. When the number of the provided at least one programming pulse is equal to the limit, the state machine 202 provides a retry-out pulse (for example, the pulse 410 in FIG. 4) and the process proceeds to block 315. In addition, a program-fail-reference signal is enabled (for example, the PGM_FAIL_REF signal in FIG. 4 is enabled) when the original fail-bit number for the multi-level cells of the high or low page is more than the predetermined fail-bit value N and the number of the provided at least one programming pulse is equal to the limit.

When the original fail-bit number for the multi-level cells of the high or low page is more than the predetermined fail-bit value N and the number of the provided at least one programming pulse is equal to the limit, block 315 is performed to enable a second program-verify operation, and then block 316 is performed to provide a second program-verify pulse to perform a second programming-verifying operation.

As shown in FIG. 1B, when the data of high page 110 is read, it is needed to use the voltage PV2 to distinguish the data of high page, "0" and "1". For the memory cell in state "01", the bit of high page of the memory cell is "0". For the memory cell in state "00", the bit of high page of the memory cell is "0". Thus, if the memory cells which are expected to be programmed to state "01" are programmed in state "00", the bit of high page of the memory cells is still sensed as "0". The sensing result is deemed to be correct. This means that for high page, the memory cells which are expected to be programmed to state "01" but are programmed in state "00" could be deemed as successfully programmed, so that the number of the multi-level cells which are expected to be programmed to state "01" but are programmed in state "00" could be excluded from FBD@C1, which is the accumulated number of the fail bits for state "01" and latched in the FBD latch module 212. "Fail~C1@B1" is defined as the number of the multi-level cells which are expected to be programmed to state "01" but are programmed in state "00", and "Fail~C1@B1" can be excluded from FBD@C1 in the second programming-verifying operation which is describes below in details.

In another example of this disclosure, when the data of low page 120 is read, it is needed to use the voltages PV1 and PV3 to distinguish the data of low page. For the memory cell in state "00", the bit of low page of the memory cell is "0". For the memory cell in state "10", the bit of low page of the memory cell is "0". Thus, if the memory cells which are expected to be programmed to state "00" are programmed in state "10", the bit of low page of the memory cells is still sensed as "0". The sensing result is deemed to be correct. In the perspective of reading data of low page, the memory cells which are expected to be programmed to state "00" but are programmed in state "10" could be deemed as successfully programmed, so that the number of the multi-level cells which are expected to be programmed to state "00" but are programmed in state "10" could be excluded from FBD@B2, which is the accumulated number of the fail bits for state "00" and latched in the FBD latch module 212. "Fail~B2@A2" is defined as the number of the multi-level cells which are expected to be programmed to state "00" but are programmed in state "10", and Fail~B2@A2 can be excluded from FBD@A2 in the second programming-verifying operation which is describes below in details.

Likewise, for the memory cell in state "01", the bit of low page of the memory cell is "1". For the memory cell in state "11", the bit of low page of the memory cell is "1". Thus, if the memory cells which are expected to be programmed to state "01" are programmed in state "11", the bit of low page of the memory cells is still sensed as "1". The sensing result is also deemed correct. In the perspective of reading data, the memory cells which are expected to be programmed to state "01" but are programmed in state "11" could be deemed as successfully programmed, so that the number of the multi-level cells which are expected to be programmed to state "01" but are programmed in state "11" could be excluded from FBD@C2, which is the accumulated number of the fail bits for state "01" and latched in the FBD latch module 212. "Fail~C2@E2" is defined as the number of the multi-level cells which are expected to be programmed to state "01" but are programmed in state "11", and Fail~C2@E2 can be excluded from FBD@C in the second programming-verifying operation which is describes below in details. In the perspective of reading data of high page, the bit of high page of the memory cells which are expected to be programmed to state "01" are programmed in state "00" is still sensed as "0". Thus, "Fail~C1@B1" is deemed as an over-counted part of FBD@C1 and is defined as an over-counting fail-bit number for high page in this disclosure. For low page, the bit of low page of the memory cells which are expected to be programmed to state "00" but are programmed in state "10" is still sensed as "0" and the bit of low page of the memory cells which are expected to be programmed to state "01" but are programmed in state "11" is still sensed as "1". Accordingly, Fail~B2@A2 is an over-counted part of FBD@B2 and Fail~C2@E2 is an over-counted part of FBD@C2. The sum of Fail~B2@A2 and Fail~C2@E2 (i.e. Fail~B2@A2+ Fail~C2@E2) is defined as an over-counting fail-bit number for low page in this disclosure.

The second programming-verifying operation aforementioned includes operations in blocks 315 to 320. Hence, a second program-verify operation is enabled in block 315, and in block 316, the state machine 202 provides at least one second program-verify pulse (for example, the pulse 414 in FIG. 4) to the FBD control 204 to obtain the over-counting fail-bit number for the high or low page. For example, for high page, Fail~C1 @B1 is obtained by the following steps. In step 1, it is performed to use voltage PV3 to accumulate the number of fail memory cells which are expected to be programmed to state "01" but are programmed to "00", "10", or "11" to obtain FBD@C1, and FBD@C1 is latched in the FBD latch module 212. In step 2, it is performed to use voltage PV2 to accumulate the number of fail memory cells which are expected to be programmed to state "01" but are programed to states "10" or "11" to obtain FBD@C1', and FBD@C1' is latched in the FBD latch module 212. Then, in step 3, in the FBD latch module 212, Fail~C1@B1 is obtained by subtracting FBD@C1' in step 2 from FBD@C1 in step 1, and Fail~C1 @B1 is the number of fail memory cells which are expected to be programmed to state "01" but are programed to "00". That is, Fail~C1@B1=FBD@C1−FBD@C1'.

For low page, Fail~B2@A2 is obtained by the following steps. In step 1, it is performed to use voltage PV2 to accumulate the number of fail memory cells which are expected to be programmed to state "00" but are programed to "10" or "11" to obtain FBD@B2, and FBD@B2 is latched in the FBD latch module 212. In step 2, it is performed to use voltage PV1 to accumulate the number of fail memory cells which are expected to be programmed to state "00" but are programed to "11" to obtain FBD@B2', and FBD@B2' is latched in the FBD latch module 212. Then, in step 3, in the FBD latch module 212, Fail~B2@A2 is obtained by subtracting FBD@B2' in step 2 from FBD@B2 in step 1, and Fail~B2@A2 is the number of fail memory cells which are expected to be programmed to state "00" but are programed to "10". That is, Fail~B2@A2=FBD@B2−FBD@B2'. For low page, Fail~C2@E2 is obtained by using voltage PV1 to accumulate the number of fail memory cells which are expected to be programmed to state "01" but are programed to state "11".

In addition, in order to readily understand the terms described above, Table 1 lists FBD@C1, FBD@C1', FBD@B1, FBD@C2, FBD@B2, FBD@B2', FBD@A2, Fail~C1 @B1, Fail~B2@A2, and Fail~C2@E2 described above and the definitions thereof. Furthermore, please refer to FIG. 1B for the definitions of E, A, B, and C in Table 1.

TABLE 1

| Terms | Definitions |
|---|---|
| FBD@C1 | For high page, the number of the multi-level cells which are expected to be programmed to state "01"(C) but are programmed in state "11"(E), state "10"(A) or state "00"(B) |
| FBD@C1' | For high page, the number of the multi-level cells which are expected to be programmed to state "01"(C) but are programmed in state "11"(E) or state "10"(A) |
| FBD@B1 | For high page, the number of the multi-level cells which are expected to be programmed to state "00"(B) but are programmed in state "11"(E) or state "10"(A) |
| Fail~C1@B1 | For high page, the number of the multi-level cells which are expected to be programmed to state "01"(C) but are programmed in state "00"(B) |
| FBD@C2 | For low page, the number of the multi-level cells which are expected to be programmed to state "01"(C) but are programmed in state "11"(E), state "10"(A) or state "00"(B) |
| FBD@B2 | For low page, the number of the multi-level cells which are expected to be programmed to state "00"(B) but are programmed in state "11"(E) or state "10"(A) |
| FBD@B2' | For low page, the number of the multi-level cells which are expected to be programmed to state "00"(B) but are programmed in state "11"(E) |
| FBD@A2 | For low page, the number of the multi-level cells which are expected to be programmed to state "10"(A) but are programmed in state "11"(E) |
| Fail~B2@A2 | For low page, the number of the multi-level cells which are expected to be programmed to state "00"(B) but are programmed in state "10"(A) |

TABLE 1-continued

| Terms | Definitions |
| --- | --- |
| Fail~C2@E2 | For low page, the number of the multi-level cells which are expected to be programmed to state "01"(C) but are programmed in state "11"(E) |

In block 318, the state machine 202 sends an over-counting-fail-bit-detect instruction to the FBD controller 204 to obtain an over-counting fail-bit number for the high or low page. For example, for high page, the FBD circuit 206 counts Fail~C1@B1 and for low page, the FBD circuit 206 counts Fail~B2@A2 and Fail~C2@E2, as mentioned above. That is, the over-counting fail-bit number for the high page is Fail~C1 @B1, and the over-counting fail-bit number for the low page is sum of Fail~B2@A2 and Fail~C2@E2, i.e. Fail~B2@A2+Fail~C2@E2.

In block 320, the FBD circuit 206 reduces the original fail-bit number by the over-counting fail-bit number(s). For example, for high page, the FBD circuit 206 sums FBD@B1 and FBD@C1 to obtain the original fail-bit number for high page, and then subtracts the over-counting fail-bit number, Fail~C1@B1, from the original fail-bit number for high page to obtain a reduced first original fail-bit number for high page. That is, the reduced original fail-bit number for high page is obtained by the equation of "FBD@B1+FBD@C1−Fail~C1@B1". Likewise, for low page, the FBD circuit 206 sums FBD@A2, FBD@B2 and FBD@C2 to obtain the original fail-bit number for low page, and then subtracts the over-counting fail-bit number, Fail~B2@A2+Fail~C2@E2, from the original fail-bit number for low page to obtain a reduced original fail-bit number for low page. That is, the reduced original fail-bit number for low page is obtained by the equation of "FBD@A2+FBD@B2+FBD@C2−(Fail~B2@A2+Fail~C2@E2)".

Figure 5:
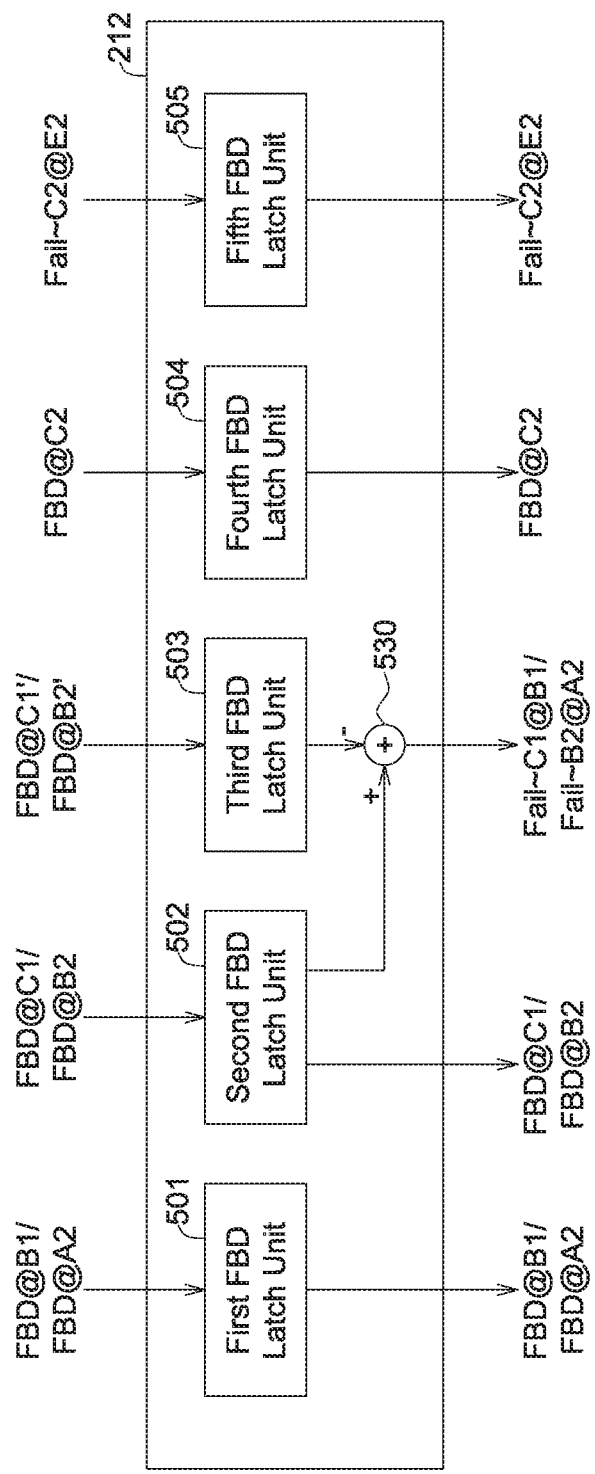
FIG. 5 is a block diagram illustrating a FBD latch module according to an embodiment of this disclosure.

The operations of obtaining the reduced original fail-bit number for high page and the reduced original fail-bit number for low page are described below in details by referring to FIG. 5. FIG. 5 is a block diagram illustrating the FBD latch module 212 according to one embodiment of the present disclosure. In one embodiment, the FBD latch module 212 includes an operator 530 and a number of FBD latch units, including a first FBD latch unit 501, a second FBD latch unit 502, a third FBD latch unit 503, a fourth FBD latch unit 504, and a fifth FBD latch unit 505. Please refer to FIGS. 1, 2 and 5. In the program-verify operation of the high page, firstly, FBD@B1, which is an accumulated number of the multi-level cells which are expected to be programmed to state "00" but are programmed in state "11" or state "10", is obtained by using voltage PV2 and is latched in the first FBD latch unit 501. Secondly, FBD@C1, which is an accumulated number of the multi-level cells which are expected to be programmed to state "00" are programmed in state "11", state "10" or state "00", is obtained by using voltage PV3 and is latched in the second FBD latch unit 502. Then, it is performed to use voltage PV2 to obtain FBD@C1', which is the number of fail memory cells which are expected to be programmed to state "01" but are programed to states "10" or "11", and then FBD@C1' is latched on the third FBD latch unit 503. By the operator 530, Fail~C1 @B1, which is the number of the multi-level cells which are expected to be programmed to state "01" but are programmed in state "00", is obtained by subtracting FBD@C1' from FBD@C1. Lastly, FBD@B1, FBD@C1 and Fail~C1@B1 are transmitted to FBD controller 204 to obtain the reduced original fail-bit number for high page by the equation of "FBD@B1+FBD@C1−Fail~C1@B1".

In the program-verify operation of the low page, firstly, FBD@A2, which is the number of the multi-level cells which are expected to be programmed to state "10" but are programmed in state "11", is obtained by using voltage PV1 and is latched in the first FBD latch unit 501. Secondly, FBD@B2, which is an accumulated number of the multi-level cells which are expected to be programmed to state "00" but are programmed in state "11" or state "10", is obtained by using voltage PV2 and is latched in the second FBD latch unit 502. Thirdly, it is performed to use voltage PV1 to obtain FBD@B2', which is the number of fail memory cells which are expected to be programmed to state "00" but are programed to states "11", and then FBD@B2' is latched in the third FBD latch unit 503. By the operator 530, Fail~B2@A2, which is the number of the multi-level cells which are expected to be programmed to state "00" but are programmed in state "10", is obtained by subtracting FBD@B2' from FBD@B2. Then, FBD@C2, which is an accumulated number of the multi-level cells which are expected to be programmed to state "01" are programmed in state "11", state "10" or state "00", is obtained by using voltage PV3 and is latched in the fourth FBD latch unit 504. Afterwards, it is performed to use voltage PV1 to obtain Fail~C2@E2, which is the number of fail memory cells which are expected to be programmed to state "01" but are programed to state "11", and Fail~C2@E2 is latched on the fifth FBD latch unit 505. Lastly, FBD@A2, FBD@B2, FBD@C2, Fail~B2@A2, and Fail~C2@E2 are transmitted to FBD controller 204 to obtain the reduced original fail-bit number for low page by the equation of "FBD@A2+FBD@B2+FBD@C2−(Fail~B2@A2+Fail~C2@E2)".

Referring to FIG. 3, in block 322, the state machine 202 determines whether the reduced original fail-bit number is more than the predetermined fail-bit value N. When the reduced original fail-bit number is equal to or less than the predetermined fail-bit value N, the state machine 202 disables the program-fail-reference signal (for example, the PGM_FAIL_REF signal 420 in FIG. 4) and enables a program-pass signal (for example, PV_PASS signal 418 in FIG. 4) to set the high or low page as programmed successfully (block 312). When the reduced original fail-bit number is more than the predetermined fail-bit value N, the state machine 202 maintains the program-fail-reference signal (for example, the PGM_FAIL_REF signal in FIG. 4 is still enabled) and then enables a program-fail signal according to the program-fail-reference signal to set the high or low page as programmed unsuccessfully or programmed failed (block 324). The program-fail signal used to indicate that the high or low page is programmed unsuccessfully is enabled or disabled by reference to the status of the program-fail-reference signal.

FIG. 4 illustrates a waveform of signals according an embodiment of this disclosure. Please refer to FIGS. 2, 3, and 4. PGM_MODE signal is enabled (for example, PGM_MODE signal changes to high voltage level 400) when the state machine 202 receives a programming mode instruction from an interface. The state machine 202 provides at least one programming pulse 402 of PGM_PULSE signal to program the multi-level cells of the high or low page of the memory. After providing the at least one programming pulse 402, an EN_PV1 signal provided by state machine 202 to FBD controller 204 is enabled (pulse 404) to perform a first programming-verifying operation and then the state machine 202 provides at least one first program-verify pulse 406 in PV signal to FBD controller 204 to verify whether the multi-level cells of the high or low page are successfully programmed. If the multi-level cells of the high or low page are not programmed successfully, the state machine 202 continues providing the at least one programming pulse 402 to program the multi-level cells of the high or low page of the memory and the at least one first program-verify pulse 406 to verify whether the multi-level cells of the high or low page are successfully programmed.

When finishing providing the at least one programming pulse, a PGM_DONE signal provided by the state machine 202 to FBD controller 204 is enabled (pulse 408). The state machine 202 further provides a retry-out pulse 410 in RETRY_OUT signal when a number of the provided at least one programming pulse 402 is equal to a limit. If the high or low page is determined as programmed unsuccessfully, a program-fail-reference signal, i.e. PGM_FAIL_REF signal, is enabled. Then, an EN_PV2 signal provided by the state machine 202 to FBD controller 204 is enabled (pulse 412) to perform a second programming-verifying operation, and the state machine 202 provides at least one second program-verify pulse 414 in PV signal after the RETRY_OUT signal and the EN_PV2 signal, that is, the at least one second program-verify pulse 414 is provided after the pulses 410 and 412. Then, the pulse 416 of PV_DONE signal is provided by the state machine 202 to FBD controller 204 to indicate the termination of a programming-verifying operation including the first programming-verifying operation and the second programming-verifying operation. After providing the at least second program-verify pulse 414, if it is determined that the high or low page is programmed successfully, PV_PASS signal provided by the state machine 202 to FED controller 204 is enabled (pulse 418) and the state machine 202 disables the program-fail-reference signal (for example, PGM_FAIL_REF signal changes to low voltage level 420). Eventually, the programming operation of the memory 210 is finished and PGM_MODE signal is disabled (for example, PGM_MODE signal changes to low voltage level 422).

In the embodiments of the present disclosure, a second programming-verifying operation is performed to the multi-level cells of the high or low page when the high or low page is set as programmed failed. An over-counting fail-bit number for the high or low page is obtained and the original fail-bit number is reduced by the over-counting fail-bit number. The high or low page is set as successfully programmed when the reduced original fail-bit number is equal to or less than the predetermined fail-bit value. As the embodiments illustrated above, in the perspective of reading data, although some memory cells are not programmed to the expected state, the bits of these memory cells are still read as being correct. Thus, some pages of the non-volatile memory could be reset as successfully programmed by subtracting the number of the memory cells which are programmed unsuccessfully but still read as being correct from the number of the multi-level cells programmed unsuccessfully. The method of this disclosure allows more fail bits of memory cells under the limitation of the number of fail-bit for ECC operation. The rate of programming successfully for the multi-level cells of the high or low page can be increased and more fail bits can be allowed for the high or low page. The ECC operation efficiency could be improved and the time for programming and verifying could be reduced. It is to save time and to improve the efficiency of programming operation.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A method for programming a non-volatile memory in a programming operation, wherein each of part of a plurality of cells of the non-volatile memory stores data having at least 2 bits at least corresponding to a first page and a second page, the method comprising:
    performing a first programming-verifying operation to the cells of the first page, the first programming-verifying operation comprising programming the cells of the first page and verifying whether the cells of the first page is successfully programmed;
    determining whether a first original fail-bit number for the cells of the first page is more than a predetermined value, if yes, setting the first page as failed;
    performing a second programming-verifying operation to the cells of the first page when the first page is set as failed, the second programming-verifying operation comprising obtaining a first over-counting fail-bit number for the first page and reducing the first original fail-bit number by the first over-counting fail-bit number; and
    determining whether the reduced first original fail-bit number is more than the predetermined value, if not, setting the first page as successfully programmed.

2. The method according to claim 1, wherein in the step of performing a first programming-verifying operation, at least one programming pulse is provided for programming the cells of the first page, and at least one first program-verify pulse is provided for verifying whether the cells of the first page is successfully programmed.

3. The method according to claim 2, further comprising:
    providing a retry-out pulse when a number of the provided at least one programming pulse is equal to a limit.

4. The method according to claim 3, wherein the second programming-verifying operation is performed after providing the retry-out pulse.

5. The method according to claim 1, wherein each of the cells has at least a first state, a second state, a third state, and a fourth state, and the first original fail-bit number is the sum of a third state fail-bit number and a fourth state fail-bit number, and the first over-counting fail-bit number is a fourth state to third state fail-bit number.

6. The method according to claim 1, further comprising:
    determining whether a second original fail-bit number for the cells of the second page is more than the predetermined value, if yes, setting the second page as failed;
    performing the second programming-verifying operation to the cells of the second page when the second page is set as failed, the second programming-verifying operation further comprising obtaining a second over-counting fail-bit number for the second page and reducing the second original fail-bit number by the second over-counting fail-bit number; and
    determining whether the reduced second original fail-bit number is more than the predetermined value, if not, setting the second page as successfully programmed.

7. The method according to claim 6, wherein each of the cells has at least a first state, a second state, a third state, and a fourth state, and the second original fail-bit number is the sum of a second state fail-bit number, a third state fail-bit number, and a fourth state fail-bit number, and the second over-counting fail-bit number is the sum of a third state to second state fail-bit number and a fourth state to first state fail-bit number.

8. The method according to claim 1, wherein the first page is set as failed by enabling a program-fail-reference signal, and the first page is set as successfully programmed by disabling the program-fail-reference signal.

9. A method for programming a non-volatile memory in a programming operation, wherein the non-volatile memory has a plurality of multi-level cells, each of part of the multi-level cells stores data having at least 2 bits at least corresponding to a first page and a second page, the method comprising:
   obtaining a first original fail-bit number and a first over-counting fail-bit number for the first page;
   reducing the first original fail-bit number by the first over-counting fail-bit number; and
   determining whether the reduced first original fail-bit number is more than a predetermined value, if not, setting the first page as successfully programmed.

10. The method according to claim 9, wherein the step of obtaining the first over-counting fail-bit number comprises providing at least one first program-verify pulse to obtain the first over-counting fail-bit number for the first page.

11. The method according to claim 9, wherein each of the cells has at least a first state, a second state, a third state, and a fourth state, and the first original fail-bit number is the sum of a third state fail-bit number and a fourth state fail-bit number, and the first over-counting fail-bit number is a fourth state to third state fail-bit number.

12. The method according to claim 9, further comprising:
   obtaining a second original fail-bit number and a second over-counting fail-bit number for the second page;
   reducing the second original fail-bit number by the second over-counting fail-bit number; and
   determining whether the reduced second original fail-bit number is more than the predetermined value, if not, setting the second page as successfully programmed.

13. The method according to claim 12, wherein each of the cells has at least a first state, a second state, a third state, and a fourth state, and the second original fail-bit number is the sum of a second state fail-bit number, a third state fail-bit number, and a fourth state fail-bit number, and the second over-counting fail-bit number is the sum of a third state to second state fail-bit number and a fourth state to first state fail-bit number.

14. The method according to claim 12, wherein the step of obtaining the second over-counting fail-bit number comprises providing at least one second program-verify pulse to obtain the second over-counting fail-bit number for the second page.

* * * * *